United States Patent
Sherman et al.

(10) Patent No.: US 11,709,810 B1
(45) Date of Patent: **\*Jul. 25, 2023**

(54) DELIVERY OF DIGITAL INFORMATION TO A REMOTE DEVICE

(71) Applicant: Valve Corporation, Bellevue, WA (US)

(72) Inventors: Taylor Karsten Sherman, Seattle, WA (US); John Cook, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/396,348

(22) Filed: Aug. 6, 2021

Related U.S. Application Data

(63) Continuation of application No. 16/245,049, filed on Jan. 10, 2019, now Pat. No. 11,157,472, which is a continuation of application No. 13/283,527, filed on Oct. 27, 2011, now Pat. No. 10,191,925.

(51) Int. Cl.
*G06F 16/00* (2019.01)
*G06F 16/21* (2019.01)
*G06F 16/174* (2019.01)
*G06F 16/17* (2019.01)

(52) U.S. Cl.
CPC ............ *G06F 16/219* (2019.01); *G06F 16/17* (2019.01); *G06F 16/1756* (2019.01)

(58) Field of Classification Search
CPC ..... G06F 16/219; G06F 16/17; G06F 16/1756
See application file for complete search history.

(56) References Cited

U.S. PATENT DOCUMENTS

| | | | |
|---|---|---|---|
| 5,822,511 A | 10/1998 | Kashyap et al. |
| 6,216,175 B1 | 4/2001 | Sliger et al. |
| 7,320,009 B1 | 1/2008 | Srivastava et al. |
| 8,996,659 B2 | 3/2015 | Werth et al. |
| 2003/0182414 A1 | 9/2003 | O'Neill |
| 2003/0212712 A1 | 11/2003 | Gu et al. |
| 2007/0192474 A1 | 8/2007 | Decasper et al. |
| 2007/0226320 A1 | 9/2007 | Hager et al. |
| 2010/0191774 A1 | 7/2010 | Mason, Jr. et al. |
| 2011/0145313 A1 | 6/2011 | Narayanan et al. |

(Continued)

OTHER PUBLICATIONS

PCT Search Report & Written Opinion for PCT App No. PCT/US21/70545, dated Aug. 31, 2021, 12 pages.

(Continued)

*Primary Examiner* — Hung Q Pham
(74) *Attorney, Agent, or Firm* — Lee & Hayes, P.C.

(57) ABSTRACT

Methods and systems relating to a file distribution scheme in a computer network are disclosed that distributes files in an efficient manner that reduces, among other things, network traffic. In an embodiment of the invention, a method for updating a file is disclosed. In such a method, unique chunks in a first version of a digital file are identified. For a second version of the digital file, chunks that are the same as in the first version are identified. Recompilation information is generated and stored for these identified chunks. Also, for the second version of the digital file, chunks in the second version that are different from chunks in the first version are identified. Recompilation information is generated and stored for these identified chunks. With this information, the second version of the digital file is completely defined and can be efficiently stored.

20 Claims, 9 Drawing Sheets

(56) References Cited

U.S. PATENT DOCUMENTS

| | | |
|---|---|---|
| 2013/0304711 A1 | 11/2013 | Resch |
| 2014/0250066 A1 | 9/2014 | Calkowski et al. |
| 2015/0286668 A1 | 10/2015 | Legler |
| 2017/0060480 A1 | 3/2017 | Gray et al. |
| 2017/0147324 A1 | 5/2017 | Weber et al. |
| 2019/0147067 A1 | 5/2019 | Rigor |
| 2020/0244731 A1 | 7/2020 | Otten et al. |
| 2020/0349126 A1 | 11/2020 | Landman |
| 2021/0329071 A1 | 10/2021 | Otten et al. |

OTHER PUBLICATIONS

Extended European Search Report dated May 20, 2022 for European Patent Application No. 19912771.3, 12 pages.

Office Action for U.S. Appl. No. 16/874,234, dated Jun. 3, 2022, Sherman, "Efficient File-Delivery Techniques", 27 pages.

Charles Bloom "Sep. 23, 2012—Patches and Deltas", retrived on Jan. 25, 2019 at <<https://cbloomrants.blogspot.com/2012/09/09-23-12-patches-and-deltas.html>>, 8 pages.

Office Action for U.S. Appl. No. 16/245,049, dated Sep. 25, 2020, Sherman, "Delivery of Digital Information to a Remote Device", 16 Pages.

Office Action for U.S. Appl. No. 16/262,431, dated Nov. 13, 2020, Otten, "Techniques for Updating Files", 33 Pages.

The PCT Search Report and Written Opinion dated Mar. 25, 2020 for PCT Application No. PCT/US19/68488, 10 pages.

Office Action for U.S. Appl. No. 16/874,234, dated Dec. 14, 2022, Sherman, Efficient File-Delivery Techniques, 26 pages.

DELIVERY OF DIGITAL INFORMATION TO A REMOTE DEVICE

PRIORITY CLAIM AND CROSS REFERENCE TO RELATED APPLICATIONS

This U.S. patent application is a continuation of and claims priority to co-pending and commonly assigned U.S. patent application Ser. No. 16/245,049, entitled "DELIVERY OF DIGITAL INFORMATION TO A REMOTE DEVICE," and filed on Jan. 10, 2019, now known as U.S. Pat. No. 11,157,472, which issued on Oct. 26, 2021, which is a continuation of and claims priority to co-pending and commonly assigned U.S. patent application Ser. No. 13/283,527, entitled "DELIVERY OF DIGITAL INFORMATION TO A REMOTE DEVICE," and filed on Oct. 27, 2011, now known as U.S. Pat. No. 10,191,925, which issued on Jan. 29, 2019. Application Ser. Nos. 16/245,049 and 13/283,527 are incorporated herein by reference in their entirety.

FIELD OF THE INVENTION

The present technology relates to delivering a file from a networked file repository and is more specifically directed to delivering a plurality of byte ranges, collectively making up an entire file, from a content delivery network.

BACKGROUND

Various applications exist where files are distributed from a content server to one or more receiving computers. In some implementations, complete digital files are transmitted. In such implementations, the receiver may be guaranteed to have the complete file. As files have grown in complexity and as more users have placed demands on available network bandwidth, sending of large files over a network such as the Internet can take a relatively long time. During the file transmission time, the network may become bogged down and not usable for other purposes. If a quality of service scheme is implemented that prioritizes other network traffic, the downloading of the file may take even longer.

The time required to download a file as well as the resources used introduce a significant cost to users. As the bandwidth usage increases, the cost and time to retrieve and send data also increases. Computing and storage systems can reduce time and other costs associated with bandwidth usage if data is retrieved and sent to storage using efficient techniques.

Accordingly, it is desirable to address the limitations in the art. For example, there exists a need to provide for systems and methods that may reduce time and network traffic for downloading, distributing, or updating a digital file.

SUMMARY

Methods and systems relating to a file distribution system are disclosed that distribute files in an efficient manner that may reduce, among other things, network traffic. In an embodiment of the invention, a method for updating a file is disclosed. In such a method, unique chunks in a first version of a digital file are identified. For a second version of the digital file, chunks that are the same as in the first version are identified. Recompilation information is generated and stored for these identified chunks. Also, for the second version of the digital file, chunks in the second version that are different from chunks in the first version are identified. Recompilation information is generated and stored for these identified chunks. With this information, the second version of the digital file is completely defined and can be efficiently stored. More particularly, unique chunks within the second version of the digital file are identified and stored. Also, the manner of recompiling the second version of the digital file is generated and stored.

In another embodiment of the invention, the second version of the digital file is generated from the first version of the digital file and unique chunks from the second version of the digital file as well as a manifest. The manifest identifies unique chunks from the first version of the digital file and unique chunks from the second version of the digital file and the manner of configuring such chunks to recompile the second version of the digital file.

In an embodiment, it is contemplated that a remote user may desire to update a file from a first version to a second version. Using an embodiment of the present invention, such updating can be implemented efficiently and with reduced network traffic. In such an embodiment, only the manifest and the unique chunks from the second version of the digital file are transmitted from a content server to the remote user. Because the remote user already has any necessary chunks from the first version of the digital file, it is not necessary to transmit such chunks over the network. The second version of the digital file is, therefore, recompiled with significantly reduced network traffic, in significantly less time.

The present invention as described above with reference to particular embodiments presents functional and palpable applications in the field of computer technology. These embodiments address a need in the art for a method and apparatus for the efficient distribution of files over a network. Indeed, embodiments of the present invention present specific applications and improvements to technologies in the marketplace for the distribution of digital files. For example, embodiments of the present invention present applications and improvements to systems and methods for the distribution of digital game files or other content.

These and other features and advantages of various aspects of the present invention will be apparent upon reading of the following detailed description of preferred embodiments taken in conjunction with the figures in which like reference numerals indicate like elements throughout.

BRIEF DESCRIPTION OF THE DRAWINGS

By way of example, reference will now be made to the accompanying drawings, which are not to scale.

DETAILED DESCRIPTION

Figure 1:
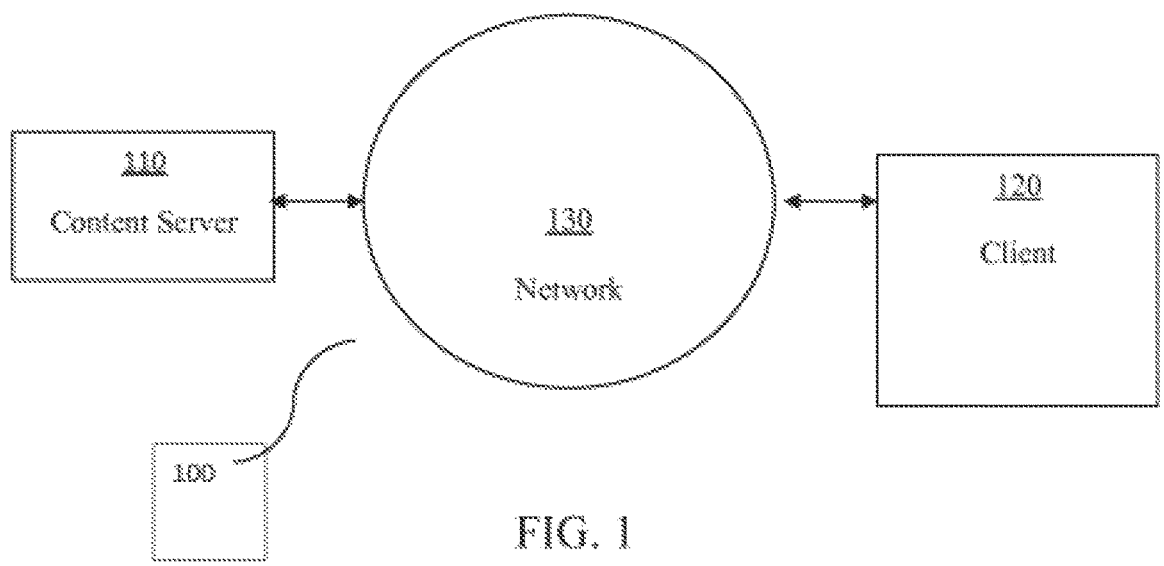
FIG. 1 illustrates an exemplary networked environment and its relevant components according to aspects of the present invention.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

FIG. 1 depicts an exemplary networked environment 100 in which systems and methods, consistent with exemplary embodiments, may be implemented. As illustrated, networked environment 100 may include a content server 110, a client 120, and a network 130. The exemplary simplified number of content servers 110, clients 120, and networks 130 illustrated in FIG. 1 can be modified as appropriate in a particular implementation. In practice, there may be additional content servers 110, clients 120, and/or networks 130.

In certain embodiments, a client 120 may include any suitable device, including, without limitation, a computer, a gaming system, a cable or satellite television set-top box, a DVD player, a digital video recorder (DVR), or a digital audio/video stream receiver, decoder, and player. A client 120 may connect to network 130 via wired and/or wireless connections, and thereby communicate or become coupled with content server 110, either directly or indirectly. Alternatively, client 120 may be associated with content server 110 through any suitable tangible computer-readable media or data storage device (such as a disk drive, CD-ROM, DVD, or the like), data stream, file, or communication channel.

Network 130 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

One or more components of networked environment 100 may perform one or more of the tasks described as being performed by one or more other components of networked environment 100.

Figure 2:
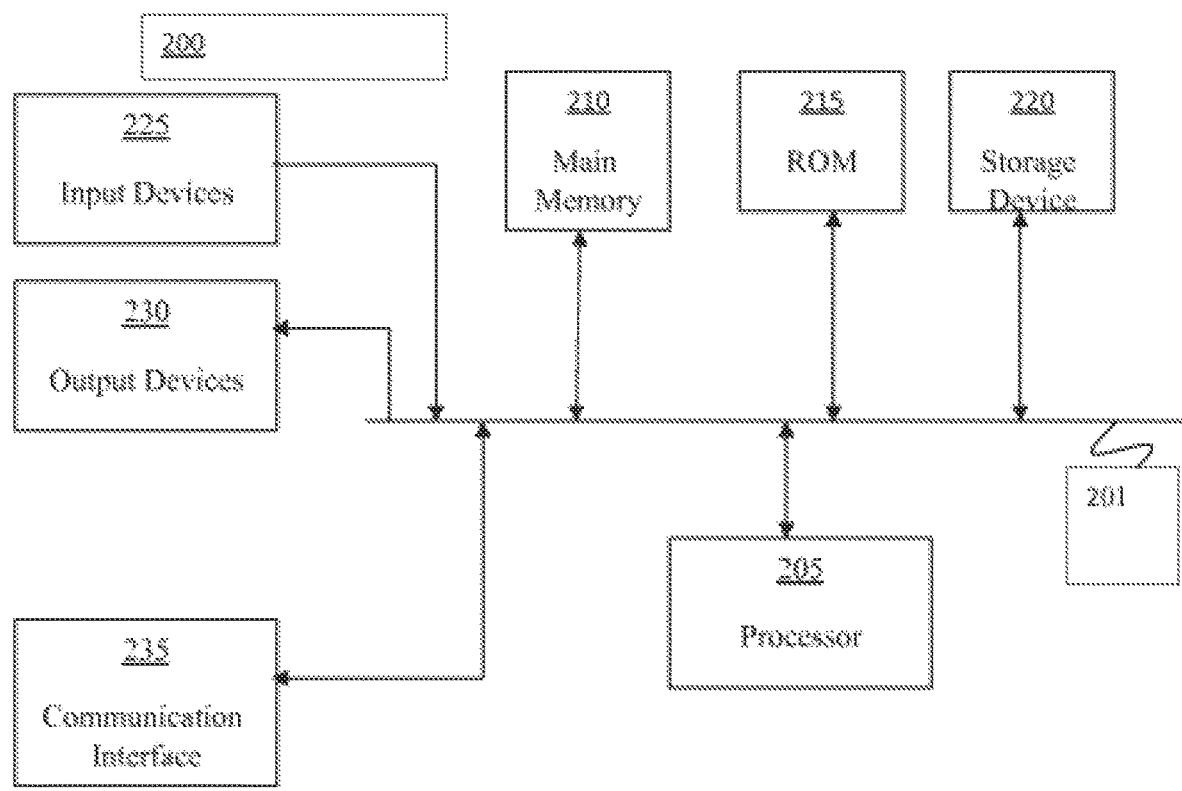
FIG. 2 is an exemplary block diagram of a computing device that may be used to implement aspects of certain embodiments of the present invention.

FIG. 2 is an exemplary diagram of a computing device 200 that may be used to implement aspects of certain embodiments of the present invention, such as aspects of content server 110 or of client 120. Computing device 200 may include a bus 201, one or more processors 205, a main memory 210, a read-only memory (ROM) 215, a storage device 220, one or more input devices 225, one or more output devices 230, and a communication interface 235. Bus 201 may include one or more conductors that permit communication among the components of computing device 200.

Processor 205 may include any type of conventional processor, microprocessor, or processing logic that interprets and executes instructions. Moreover, processor 205 may include processors with multiple cores. Also, processor 205 may be multiple processors. Main memory 210 may include a random-access memory (RAM) or another type of dynamic storage device that stores information and instructions for execution by processor 205. ROM 215 may include a conventional ROM device or another type of static storage device that stores static information and instructions for use by processor 205. Storage device 220 may include a magnetic and/or optical recording medium and its corresponding drive.

Input device(s) 225 may include one or more conventional mechanisms that permit a user to input information to computing device 200, such as a keyboard, a mouse, a pen, a stylus, handwriting recognition, voice recognition, biometric mechanisms, and the like. Output device(s) 230 may include one or more conventional mechanisms that output information to the user, including a display, a projector, an A/V receiver, a printer, a speaker, and the like. Communication interface 235 may include any transceiver-like mechanism that enables computing device/server 200 to communicate with other devices and/or systems. For example, communication interface 235 may include mechanisms for communicating with another device or system via a network, such as network 130 as shown in FIG. 1.

As will be described in detail below, computing device 200 may perform operations based on software instructions that may be read into memory 210 from another computer-readable medium, such as data storage device 220, or from another device via communication interface 235. The software instructions contained in memory 210 cause processor 205 to perform processes that will be described later. Alternatively, hardwired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 200. The web browser may comprise any type of visual display capable of displaying information received via the network 130 shown in FIG. 1, such as Microsoft's Internet Explorer browser, Netscape's Navigator browser, Mozilla's Firefox browser, PalmSource's Web Browser, Google's Chrome browser or any other commercially available or customized browsing or other application software capable of communicating with network 130.

The browser may act as an intermediary between the user and the computing device 200 and/or the network 130. For example, source data or other information received from devices connected to the network 130 may be output via the browser. Also, the browser may be capable of performing operations on the received source information prior to outputting the source information. Further, the browser may receive user input and transmit the inputted data to devices connected to network 130.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

Methods according to certain embodiments begin by receiving an initial set of content files (e.g., game files) from a developer. This set of files is analyzed and used to create the initial version of one or more depots, where a depot may comprise a logical repository of data such as game data, and in certain embodiments relating to computer games may comprise an entire game or a subset of content (e.g. add-ons, localized content, shared components). A depot may be divided into one or more versions in certain embodiments, and a depot ID may comprise a unique numerical identifier for each depot. Once the initial version of one or more depots is created, these depots are placed on one or more content servers such as content server 110 shown in FIG. 1. Authorized users subsequently download data from these depots from the content servers, and use that data to re-create the image of the content (e.g., game files) as received from the developer, so that they may use the content (e.g. play the game).

When an updated set of content (e.g., game files representing an updated game version) is subsequently received, the received files are again analyzed, to determine what data differs from any previous version(s). This information is used to create a new version of the depots, and these depots are then placed on the content servers. Authorized users subsequently download data from these depots, and use that downloaded data to update or patch their existing files (which may be incomplete), so that they are now able to use the revised content (e.g., play the latest version of the game).

Methods and systems according to certain embodiments divide the content files (e.g., game files) up into contiguous sections of data called chunks, each of which represents a section of data that may be found in one or more files, in at least one version of a given depot. A given chunk may be present more than one time in a single file. A file may be re-assembled by appending the appropriate chunks together. The manifest, or metadata, for a depot version in certain embodiments then comprises a relatively simple set of structures. One such structure is a tree structure of the directories and files that make up the completed version (directories may be empty). Another such structure comprises, for each file, a list of chunks that compose that file and the byte offsets at which they reside (files may be empty, therefore have zero chunks in this list). Another such structure comprises, for each chunk, any associated metadata such as size, CRC (cyclic redundancy code), SHA (secure hash algorithm), and the like. The content of a depot version then comprises, in certain embodiments, the manifest and a set of all the chunks referenced by it. Additionally, the content of the set of any K versions for a depot consists of K manifests, and the set of all chunks referenced by those manifests. When a client (such as client 120 shown in FIG. 1) needs to update the content files (e.g., game files) on a user's computer, it downloads the selected (e.g., latest, or Beta) version's manifest, then determines which chunks it is missing, downloads them, and uses the downloaded data to update the local files. Note that in certain embodiments there is no linear chain of versions (i.e., it is not necessary, when updating from version 1 to version 3 of a certain set of content, for example, to execute the intermediate and sequential steps of updating first from version 1 to version 2 and then from version 2 to version 3) and any given version may be identified simply by the SHA of its manifest In certain embodiments chunks are not shared across depots because chunks are encrypted in such embodiments, and each depot has a separate encryption key to enhance security.

To minimize the required download size, methods and systems according to certain embodiments determine what has changed between versions, and find any data that exist in more than one place within a given version. To analyze sections of data, in certain embodiments they may be fingerprinted or tagged using two different methods. One, a CRC, is relatively quick to compute, but relatively likely to have collisions (that is, other pieces of data may result in the same CRC). Another potential method, a SHA-1 hash, takes relatively longer to compute but is much less likely to result in collisions (and the likelihood of a collision may be considered a near impossibility).

To convert a version's files into chunks according to certain embodiments, each file is analyzed in turn. Bytes 0 through N of the file are read to comprise a chunk (e.g., N may be set to equal one megabyte or some other suitable number), and the CRC of this chunk is calculated. If the CRC is known to have previously encountered for the depot at issue, methods according to certain embodiments may "suspect" that this N-byte chunk may be the same as another chunk elsewhere (i.e., the same as a previously encountered chunk having the same CRC result). In this case the SHA-1 hash of the two "candidate" chunks may be computed, for example. If this operation results in a match, there is a very high likelihood that the two candidate chunks are identical. The first N bytes of the filed being analyzed may then be designated as chunk Z, where Z is the SHA-1 of the relevant data comprising the chunk.

Figure 6:
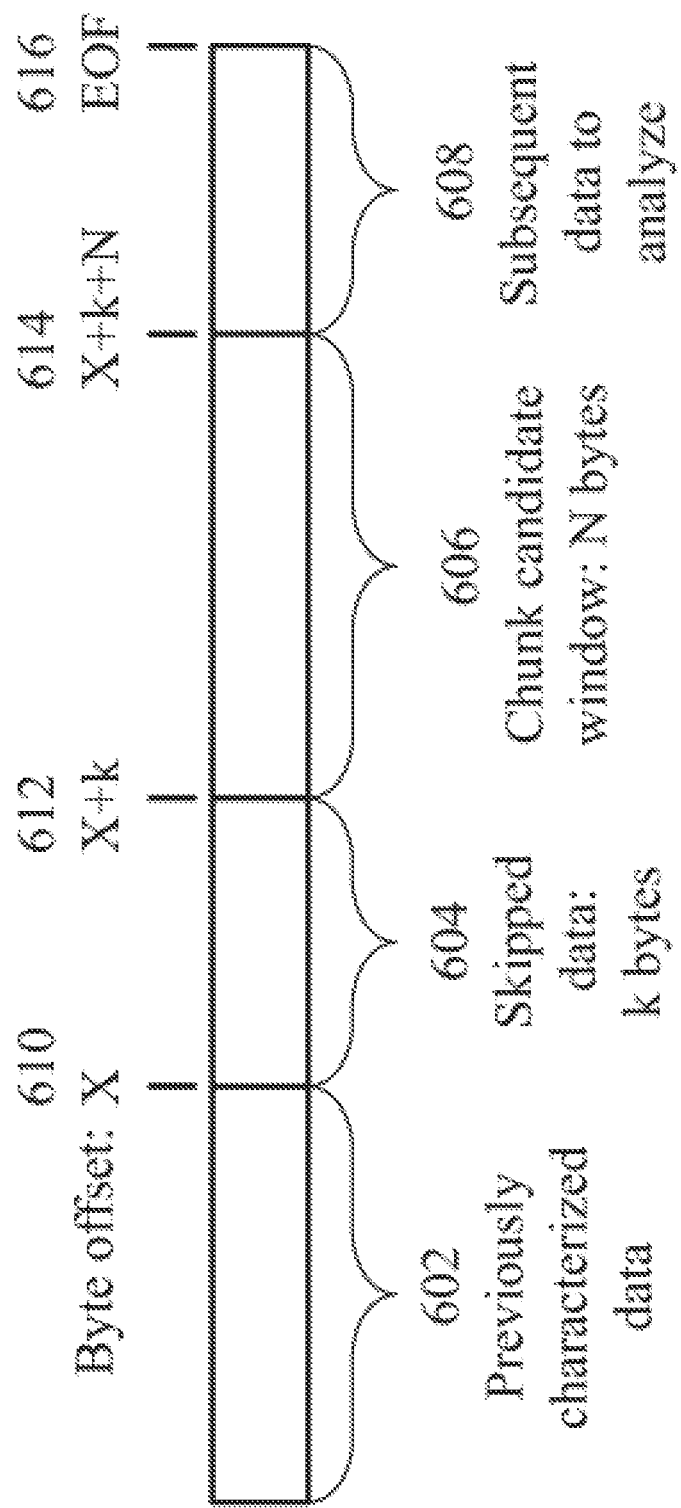
FIG. 6 depicts a block diagram according to aspects of the present invention that may be used to illustrate the manner of identifying unique chunks in a second version of a digital file that is L bytes long.

If the CRC or SHA-1 values for bytes 0 through N do not match those of any previously defined chunks in the depot, bytes 1 through N+1 (defining a new candidate window) are then analyzed instead and compared to previously identified chunks, and so on. A block diagram of this process as implemented in certain embodiments is depicted in FIG. 6. A rolling CRC algorithm known to those skilled in the art may be implemented (see, e.g., United States Published Patent Application No. 2004/0098655, incorporated herein by reference), for example, which makes repeatedly calculating the CRC of the new window of data relatively quick. The same logic applies as above. If a new candidate window is identified as a known chunk, the candidate window is designated as being identical to the known chunk. Otherwise the candidate window is slid one more byte forward in the file (e.g., bytes 2 through N+2 define the new candidate window, and the comparison process continues).

Referring once more to FIG. 6, a block diagram that may be used to illustrate the manner of identifying unique chunks in a second version of a digital file that is L bytes long is shown (in FIG. 6, non-overlapping file portions 602, 604, 606, and 608 comprise a file that is L bytes long). For reference, shown as file portion 602 is previously characterized data that is X bytes long. Shown as file portion 604 is skipped data that is k bytes long. Shown as file portion 606 is a chunk candidate window that is N bytes long. Shown as file portion 608 is a section of the digital file that is yet to be analyzed and extends through the end of the file.

Where a match is found in comparing a chunk candidate window with a previously known chunk, the chunk candidate window is tagged or designated as being identical to the previously known chunk. Comparison through the end of the file continues as described elsewhere herein. The location and other information for each of these chunks is recorded.

Figure 8:
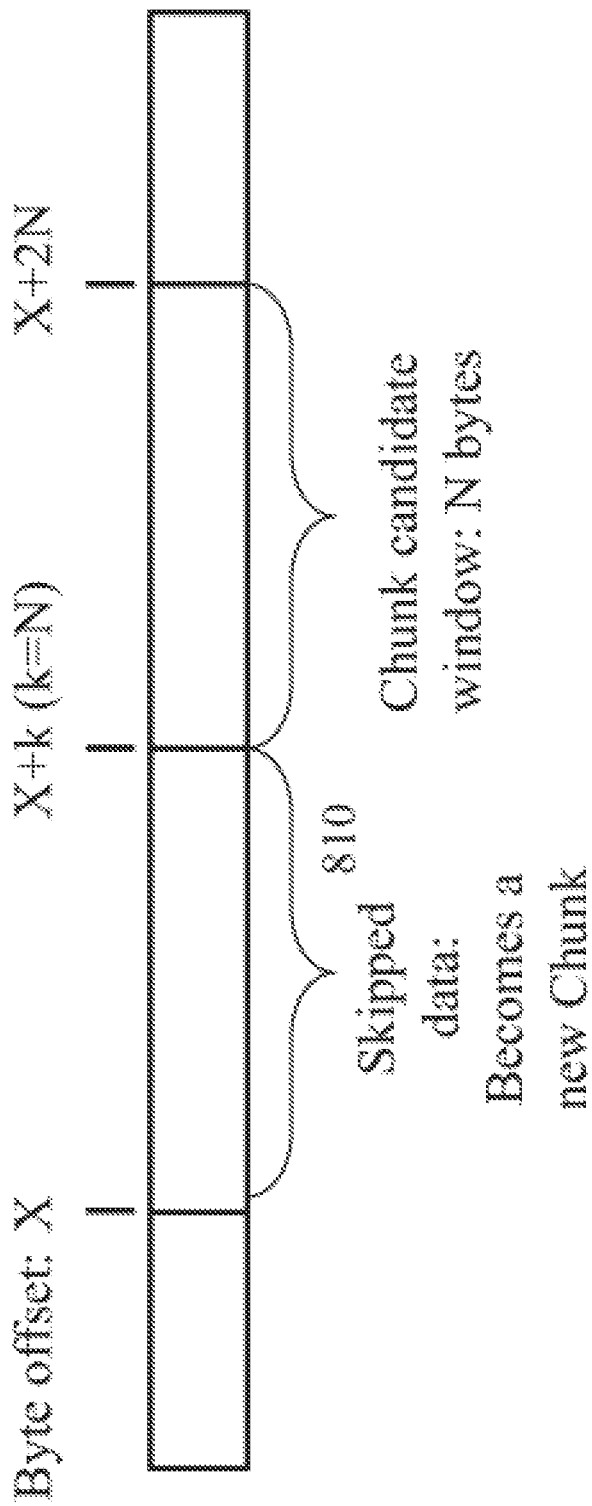
FIG. 8 depicts a block diagram relating to the creation of a new chunk of data based on skipped data, according to aspects of the present invention.

In certain embodiments, note that according to the process described above, byte 0, and perhaps byte 1, of the file is now designated as skipped data. Skipped data may comprise data after the last chunk that has been found or created (or the beginning of the file), and before the sliding window of data currently being analyzed. If the size of this skipped data reaches N bytes, methods according to certain embodiments determine that a new chunk of never-before-seen data has been found, and identify it as a new chunk designated by the SHA-1 of the data comprising the chunk. A block diagram of this process as implemented in certain embodiments is depicted in FIG. 8, which depicts the creation of a new chunk (810) after failing to find any existing chunk at offsets X through X+N.

Figure 7:
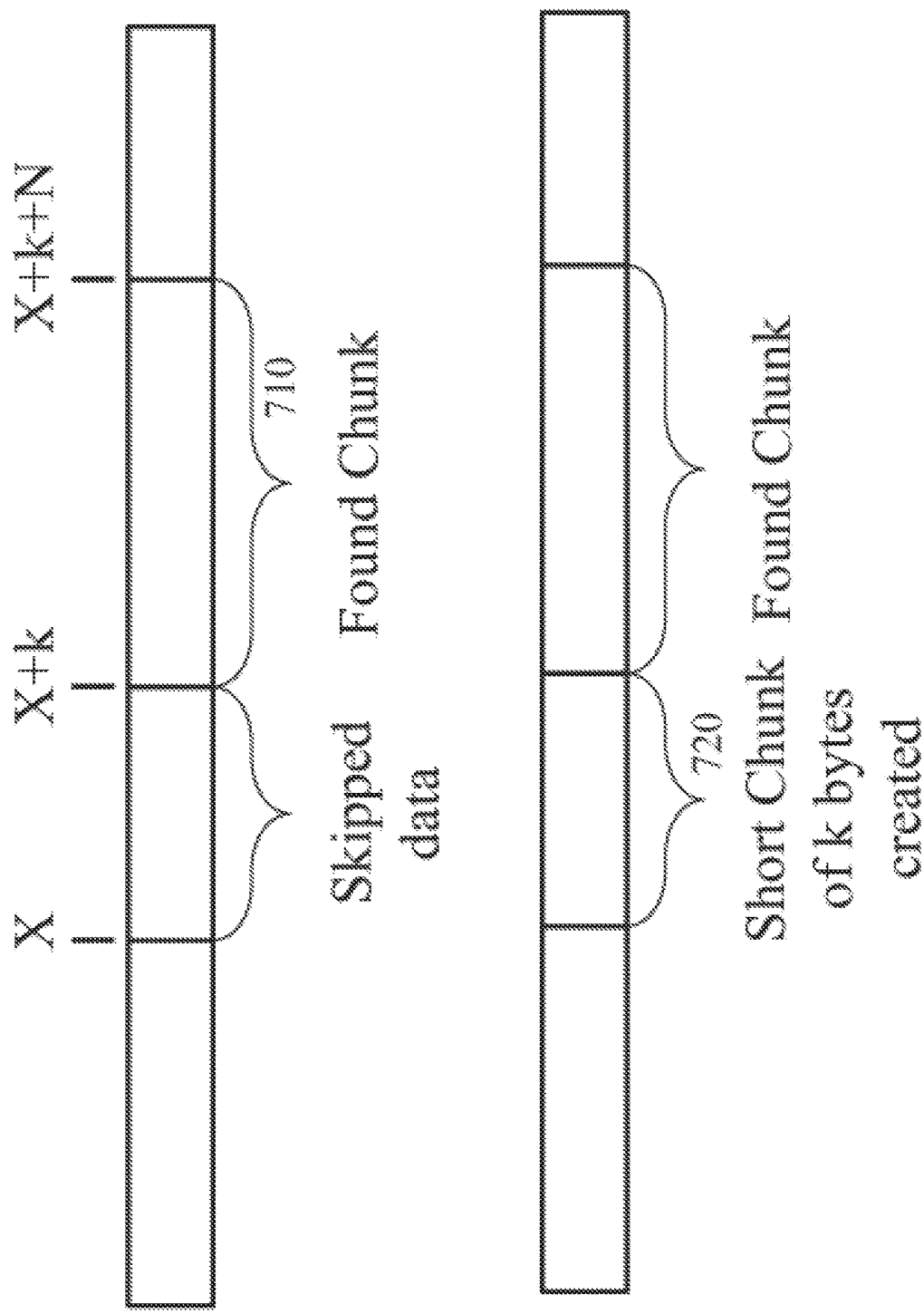
FIG. 7 depicts a block diagram relating to discovery of an existing chunk, the subsequent recognition of new data before that chunk, and then the creation of a new chunk using that new data, according to aspects of the present invention.

When a known chunk is found via the sliding window described above according to certain embodiments, it is possible that the skipped data may comprise fewer than N bytes. This set of skipped data will become designated as a "small chunk," and it may be a new chunk, or instead it may be a small chunk that has been found and identified previously. The CRC and SHA-1 of this small chunk is calculated, and then compared against a table of known chunks to make that determination. A block diagram of this process as implemented in certain embodiments is depicted in FIG. 7. Thus, in certain embodiments the minimum size for a chunk is one byte, and the maximum is N bytes. In certain embodiments, if the small section of data is determined to consist of some number of smaller, previously-existing chunks, now arranged contiguously, they may be converted into a single larger chunk. Thus, FIG. 7 depicts discovery of an existing chunk (710), the subsequent recognition of new data before that chunk, and then the creation of a new chunk (720) using that new data in certain embodiments.

Figure 9:
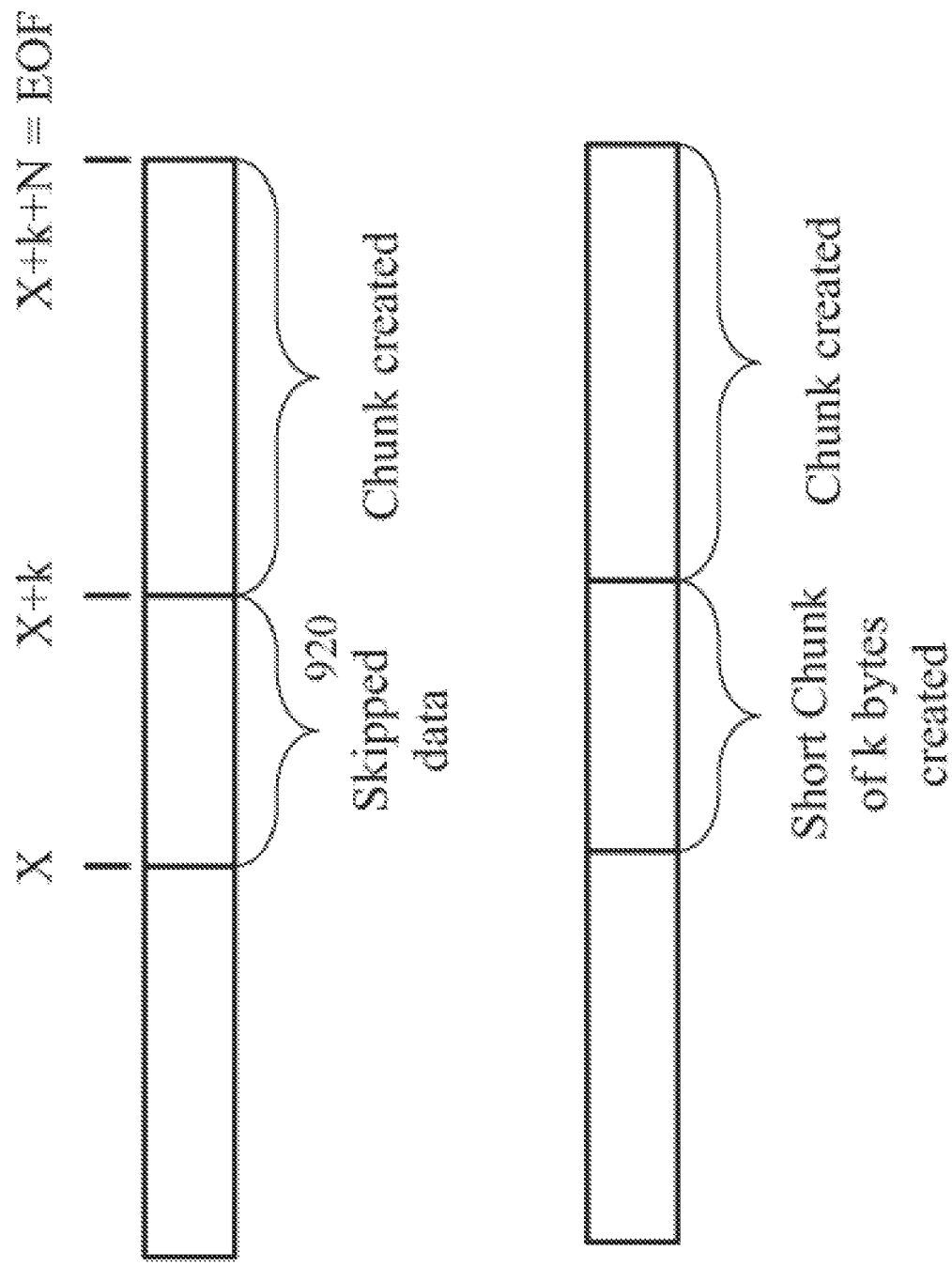
FIG. 9 depicts a block diagram relating to processing steps near or at the end of a file, according to aspects of the present invention.

In certain embodiments when the end of the N-byte long sliding window encounters the end of the file, the SHA-1 of the last N-byte window is calculated, and a determination is made as to whether this comprises an existing chunk. Otherwise, this N-byte window becomes a new chunk. A block diagram of this process as implemented in certain embodiments is depicted in FIG. 9, which depicts the creation of new chunks (920) when the end of file is reached, in the case where no existing chunks were found for offsets X through X+k.

According to embodiments of the methods and systems described herein, thus, if a file contains any N-byte section/chunk of data that is determined to be the same as an N-byte section/chunk that has been seen before/elsewhere, the system recognizes this fact and notes that a new copy of an existing chunk has been encountered, rather than creating a new chunk. Also, contiguous small chunks may be, at each version creation, coalesced into the minimum number of full-sized chunks possible, plus one remainder chunk if necessary.

Figure 3:
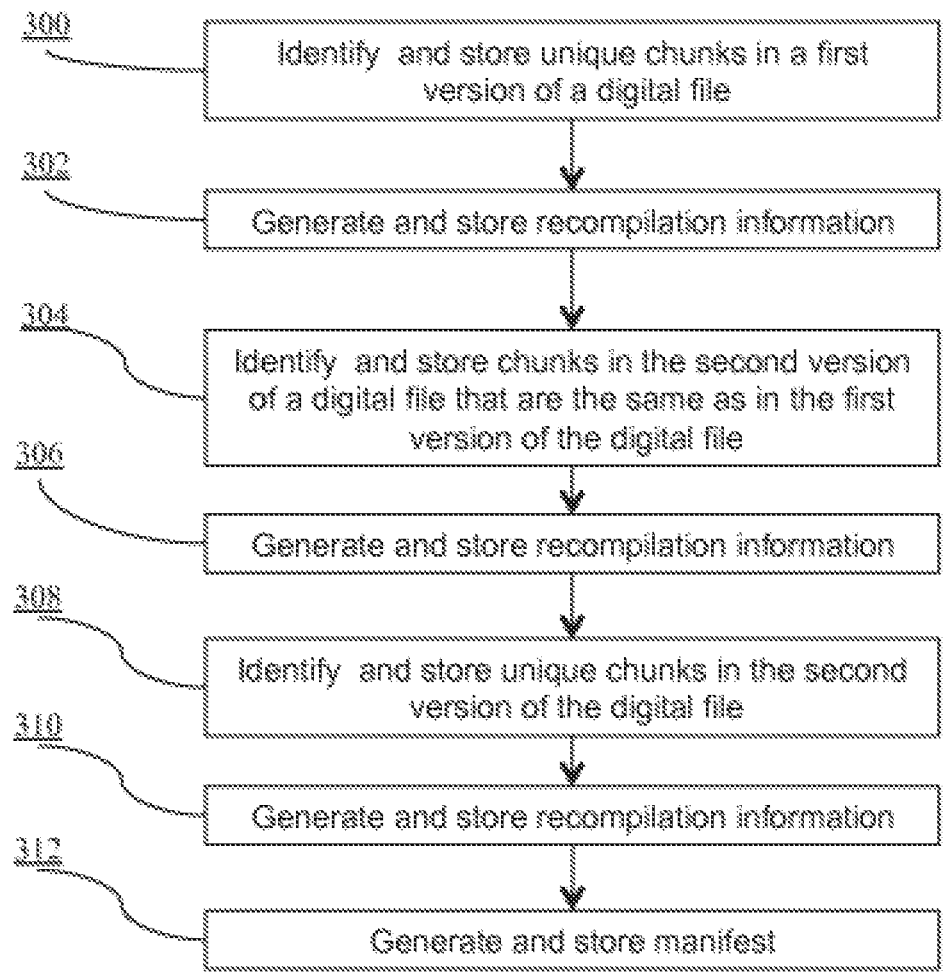
FIG. 3 depicts a flow chart relating to a method for performing updates to a digital file according to an embodiment of the present invention.

Shown in FIG. 3 is a method for performing updates to a digital file according to an embodiment of the present invention. As shown at step 300, a method according to an embodiment of the present invention identifies and stores unique chunks (contiguous sections of data found within one or more files) of digital information in a first version of a digital file. In order to determine whether a chunk has been previously analyzed, various types of comparisons can be performed. For example, as described above, a cyclic redundancy code ("CRC") can be calculated and compared to the CRCs of previously characterized chunks. A CRC can be performed quickly and efficiently but is not conclusive of a match because it is possible that different files can have a CRC match, that is, there can be collisions. To confirm a true match when there is a CRC match, a more computationally intensive SHA-1 hash, for example, as also described above, may be performed on the suspect chunks. A SHA-1 match may be assumed to be a file match to a previously characterized file.

At step 302, recompilation information is generated and stored for each unique chunk of digital information. Among other things, the recompilation information may include file offset information about the unique chunks of digital information. Other information can include, for example, information regarding a file and directory structure, file chunk mappings, and encryption key information, among other things. The unique chunks of digital information and information about the locations of such chunks of digital information is, therefore, sufficient information to recompile the first version of the digital file. For example, the recompilation information may provide the locations for potentially multiple instantiations of each of the unique chunks of digital information. In this way, the digital file can be efficiently stored while also being readily available in its complete form.

The method of FIG. 3 provides further steps for generating a second version of the digital file that uses, among other things, information about the first version of the digital file as described with reference to steps 300 and 302. At step 304, the method for generating a second version of the digital file continues by identifying any chunks in a second version of the digital file that are the same as in the first version. In order to determine whether a chunk has been previously analyzed, various types of comparisons can be performed, as described earlier. Because the second version may be similar to the first version, it may be possible that many chunks are the same. Where the second version contains some of the same chunks as in the first version, according to an embodiment of the invention, it is not necessary to further store those same chunks that are contained in the second version.

At step 306, recompilation information is generated and stored for the chunks identified at step 304.

The method continues at step 308 by identifying and storing unique chunks in the second version of the digital file. These are chunks in the second version that are not found in the first version and are required to generate the second version of the digital file. CRC and SHA-1 hashes, for example, can also be implemented here.

At step 310, recompilation information is generated and stored for each unique chunk of digital information identified at step 308. Among other things, the recompilation information includes file offset information about the unique chunks of digital information. Other information can include, for example, information regarding a file and directory structure, file chunk mappings, and encryption key information, among other things. For the second version of the digital file, the unique chunks of digital information from the first and second versions of the digital file and information about the locations of such chunks of digital information is, therefore, sufficient information to recompile the second version of the digital file. For example, the recompilation information provides the locations for potentially multiple instantiations of each of the unique chunks of digital information. When reconfigured in such an appropriate manner, the first version of the digital file can be recompiled. Also, the second version of the digital file can be efficiently stored while also being readily available in its complete form.

To facilitate the process of recompiling the second version of the digital file, at step 312, a manifest is generated and stored that includes, among other things, the recompilation information of step 306 and 310. Other information that can be included in the manifest include, for example, information regarding a file and directory structure, file chunk mappings, and encryption key information.

Figure 4:
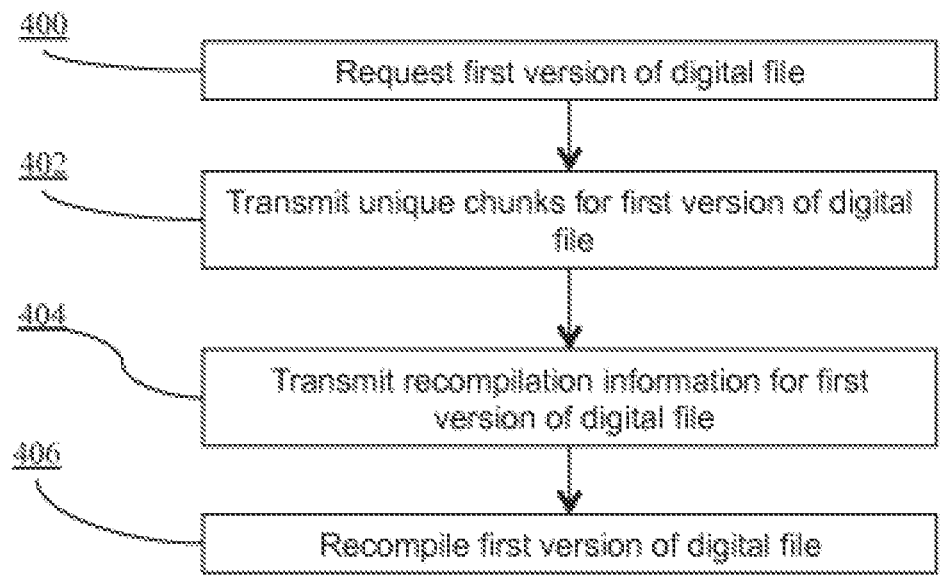
FIG. 4 depicts a flow chart relating to a method for recompiling a first version of a digital file using information obtained, for example, through the method depicted in FIG. 3.

Shown in FIG. 4 is an exemplary method for recompiling a first version of a digital file using information obtained, for example, through the method depicted in FIG. 3. For illustration, the method depicted in FIG. 4 will be described in the context of FIG. 1, which includes a client 120 that desires to have a first version of a digital file. Content server 110 is configured to provide the first version of the digital file through network 130. As will be understood, using the method depicted in FIG. 3, the complete contents of the first version of the digital file may not be required to be transmitted from content server 110 through network 130 to client 120 if unique chunks of digital information are used multiple times in the first version of the digital file.

At step 400, in one embodiment a command is initiated by client 120 requesting the first version of the digital file. In other embodiments, content server 110 initiates the process. In another embodiment, the process is initiated in a scheduled manner. In still another embodiment, the process is initiated by a third-party content provider. Where receiver 200 has no other information about the first version of the digital file, content server 110 responds by transmitting every unique chunk in the first version of the digital file at step 402 and also transmitting the recompilation information for each chunk at step 404. Upon receiving such information, client 120 then has sufficient information to recompile the first version of the digital file at step 406. In an embodiment of the invention, client 120 is implemented as a computer such as shown in FIG. 2.

Figure 5:
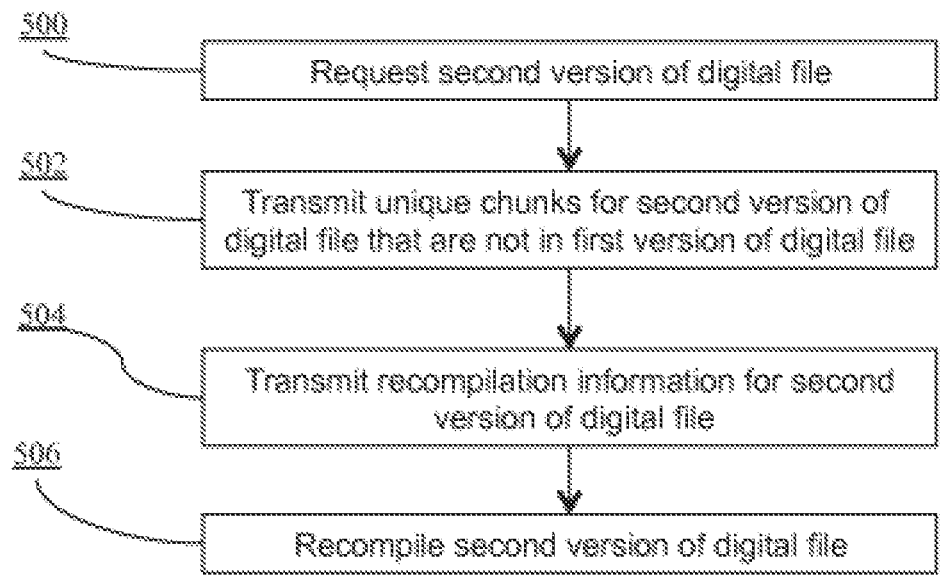
FIG. 5 depicts a flow chart relating to a method for recompiling a second version of the digital file using information obtained, for example, through the method depicted in FIG. 3.

Shown in FIG. 5 is an exemplary method for recompiling a second version of the digital file using information obtained, for example, through the method depicted in FIG. 3. In the method depicted FIG. 5, it is assumed that client 120 has the first version of the digital file.

In an embodiment of the invention, the unique chunks for the first version of the digital file and the recompilation information are stored by client 120 as they are received from content server 110. In another embodiment, only the recompilation information is stored. Where unique chunks from the first version may subsequently be desired, they are located and extracted using the recompilation information. In yet another embodiment of the invention, neither the unique chunks nor the recompilation information is retained. Instead, if such information is subsequently desired, steps 300 and 302 as depicted in FIG. 3 are reinitiated to generate the same chunks and recompilation information that was previously generated.

At step 500 of FIG. 5, in one embodiment a command is initiated by client 120 requesting the second version of the digital file. In other embodiments, content server 110 initiates the process. In another embodiment, the process is initiated in a scheduled manner. In still another embodiment, the process is initiated by a third-party content provider.

In an embodiment of the invention, client 120 may further indicate that it has the first version of the digital file. In another embodiment of the invention, content server 110 may retain information indicating that client 120 has the first version of the digital file. In any case, content server 110 need not transmit the unique chunks from the first version of the digital file because client 120 already has them. At step 502, content server 110 responds by transmitting every unique chunk in the second version of the digital file at step 502 and also transmitting the recompilation information for each chunk at step 504. Notably, the recompilation information contains information about the manner of recompiling the second version of the digital file using the unique chunks from the first version of the digital file and the unique chunks from the second version of the digital file. Upon receiving such information, client 120 then has sufficient information to recompile the first version of the digital file at step 506.

Through the implementation of the method depicted in FIG. 5, the second version of the digital file can be generated with potentially reduced data being transmitted from content server 110 to client 120 via network 130. For example, in order to generate the second version of the digital file, it may only be necessary in certain embodiments to transmit less that 10% of the entire digital file. Advantageously, implementation of aspects of the present invention can significantly reduce network traffic. Also, implementation of embodiments of the present invention may significantly increase the speed at which a client 120 has the second version of the digital file available to it.

In accordance with methods for identifying unique chunks in digital files in a first version of a digital file and in a second version of a digital file according to aspects of the present invention, to determine whether a file has been previously analyzed various types of comparisons can be performed, as described earlier. For example, for a file that is N bytes long, a CRC can be calculated and compared to the CRCs of previously characterized files. To confirm a match when there is a CRC match, a SHA-1 hash may be performed on the suspect files. Accordingly, the suspect file need not be duplicatively analyzed.

For a file that is L bytes long, where L is greater than N, the first N bytes of the file may be compared as above to previously characterized files or portions of files. For example, a CRC of the first N bytes of the L-byte long file can be calculated and compared to the CRCs of previously characterized files or portions of files. To confirm a match when there is a CRC match, a SHA-1 hash, for example, may be performed on the suspect files.

For a file that is L bytes long where no match is found in the first N bytes, bytes y through N+y (in a first pass y=1 and incremented in subsequent passes) are then compared as above to previously characterized files or portions of files. For example, a CRC of bytes 1 through N+1 bytes of the L-byte long file can be calculated and compared to the CRCs of previously characterized files or portions of files. In one embodiment, a "rolling CRC" algorithm, as described earlier, makes calculating the CRC of this new "window" of data fast and efficient. To confirm a match when there is a CRC match, a SHA-1 hash, for example, may be performed on the suspect files. When there is no match, y is incremented and this process repeated until a match is found or until the end of the file is reached.

In certain embodiments, the granularity of the process may be controlled by adjusting the default and maximum chunk size, N. When analyzing a new version's files, any N-byte sections/chunks that existed previously will be found and identified according to the methods and systems described herein, while any new data will result in creation of new chunks. In the extreme, if N=1, then the client would never have to download more than 256 1-byte chunks; it could then assemble those bytes into any possible file. However, the manifest size in this case would be very large, as twenty bytes (the size of a SHA-1 result, for example) for each byte of content would be required. This extreme therefore is not considered practical in most applications. On the other extreme, if N was extremely large (larger than any files), then each chunk would represent a file in that version. Any files that changed in the next version would become new chunks, and the old chunks would likely be discarded. The users in this case would download the changed file in its entirety, and the efficiency benefits that may be possible with certain embodiments would not be realized.

Therefore, selecting N becomes an exercise in finding a good tradeoff between difference efficiency and manifest size. It may also affect content server performance, as the request granularity may be largely determined by the average chunk size. This affects the number of requests per second, as well as the size of data read from disk and cached in memory. Determining a good chunk size for a particular implementation will likely depend on each depot's structure (i.e., the number and size of files), as well as on how the versions of said depot evolve over time. In certain embodiments relating to distribution of computer game files, N has been set as one megabyte (1 MB) based on empirical observations and predictive calculations. Persons skilled in the art will be readily able to determine an adequate setting for N in a given implementation.

In certain embodiments, digital content such as game files may therefore be distributed to client computers such that users may play the latest released version of a game soon after it is released. Embodiments may also allow game or other content developers to test their code before an official release date, and/or to test updates to their code (e.g., games) using a small (public or private) subset of clients (e.g., to perform beta testing). Certain embodiments may also assist in reducing or eliminating the incidence of unauthorized users gaining access to content data.

To analyze files rapidly, in certain embodiments disk I/O (input/output) operations and CPU processing may be performed in parallel. If a computer performing steps according to embodiments of the present invention comprises multiple CPU cores, multiple program execution threads in may be used parallel to utilize all of the available cores as appropriate for each particular implementation.

The "chunking" process described herein in certain embodiments involves reading file data, scanning it for chunks, compressing and/or encrypting the chunks found, and writing the processed chunks to disk. This may involve using multiple file-reader threads, multiple file-processing threads, and multiple chunk-writing threads, and all three of these operations may operate in parallel, depending on the requirements of each particular implementation. In such embodiments a queue system may be used to ensure that all threads are assigned a task.

In certain embodiments, small files can be read entirely into memory and processed as a single operation. Larger files may be divided into sections. Preferably, the size of the sections should be relatively large compared to the default chunk size, but should be small enough to fit into memory. One possible value would be 32 MB, when 1 MB chunks are used.

Figure 10:
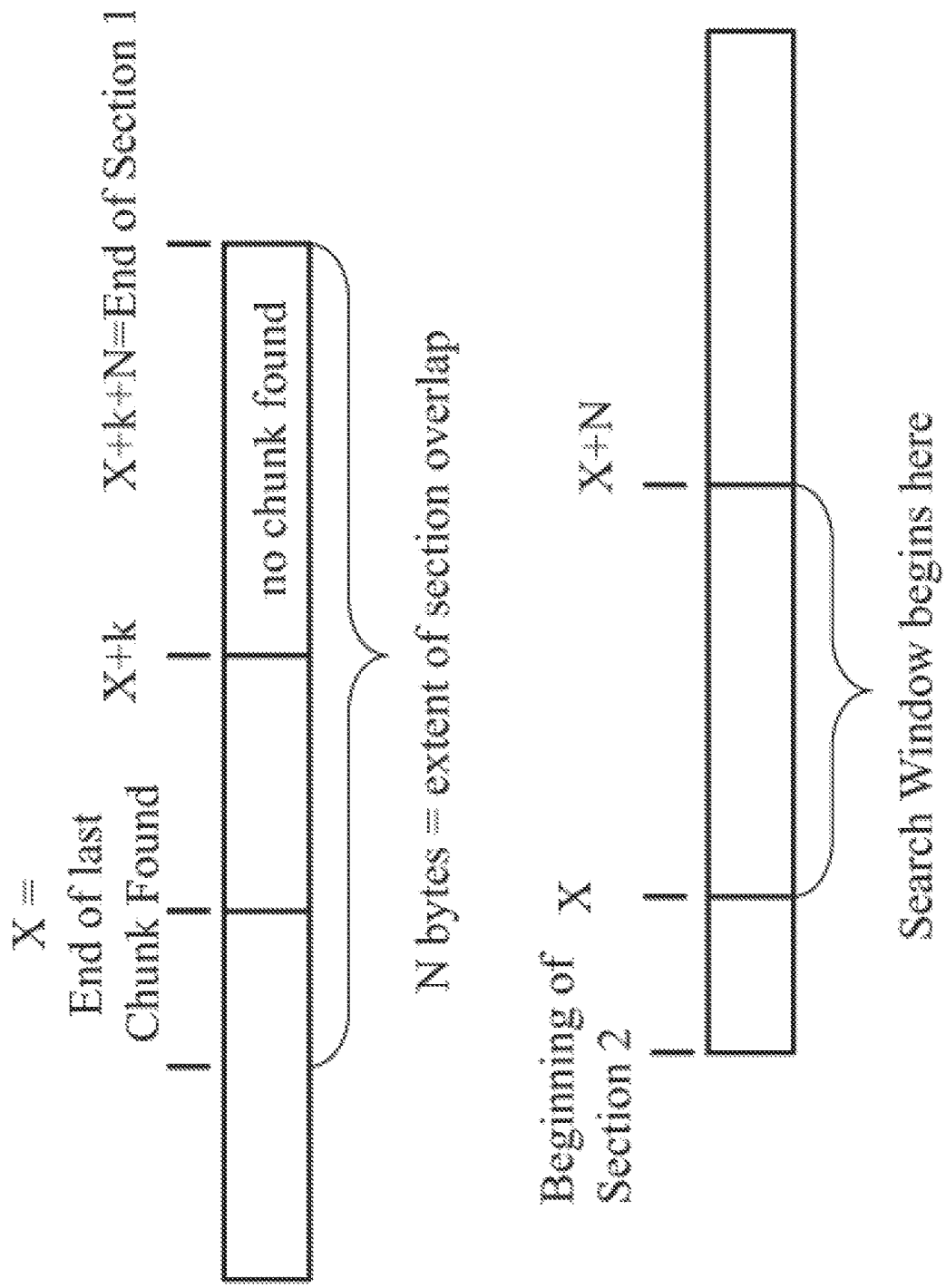
FIG. 10 depicts a block diagram relating to processing steps involving file section overlap, according to aspects of the present invention, which involve dividing the file up into large sections that can be processed in parallel.

Because breaking up files into sections in certain embodiments creates artificial boundaries in the data, care must be taken when searching for chunks. Preferably, each file section should overlap the previous section by the default chunk size (N), and sections should be processed in order. This arrangement helps to ensure that any chunks that exist in their entirety in the first section are initially found; then, a remainder of up to N bytes is left. The second section is processed beginning with that remainder, which will by definition be inside of the overlapped data. FIG. 10 depicts an exemplary method of dividing a file into relatively large sections that can be processed in parallel, tending to guarantee that existing chunks will be found regardless of processing order, and also utilizing the smallest possible section overlap of N bytes.

To ensure the sequential processing of a file's sections, each file reader thread may be associated with a single file-processing thread. If this overlap were not present, an existing chunk which straddled the section boundaries would not be found; essentially it would get split in two. Worse, a small change to the file in the next version may shift the boundary slightly, causing those same two split chunks to be split differently and yielding two different small chunks. This may happen to the chunks at every section boundary after the changes—for a large file, there could be dozens or even hundreds of such boundaries affected.

One potential downside of the above overlapping arrangement in certain embodiments may be that the data in the overlapped areas is read from disk and processed twice. However, in certain embodiments this tradeoff may be worthwhile to provide the benefits discussed above.

As an example, if a file is divided into 10 MB sections, the data given to each processing job would be as follows: job 1—bytes 0 through 10 MB; job 2—bytes 9 MB through 20 MB; job 3—bytes 19 MB through 30 MB, and so on. In this arrangement, job 1 is ensured to find any chunks that exist entirely within the data between 0 MB and 10 MB, job 2 will find any chunks that overlap the 10 MB boundary, and any chunks that exist entirely between 10 MB and 20 MB, job 3 will find any chunks that overlap the 20 MB boundary, and any chunks that exist entirely between 20 MB and 30 MB, and so on. The exemplary section size of 10 MB is variable, but preferably should be larger than the chunk size. Larger section sizes involve less overlapping processing. However, larger section sizes also require larger buffers in memory. Skilled artisans will readily be able to determine an appropriate section size for each particular implementation.

In certain embodiments, when a client process (such as a process running on client 120 shown in FIG. 1) begins to update a set of content (e.g., a computer game), either automatically or when explicitly instructed to, it first requests the ID (e.g., SHA-1 value) of the latest version's manifest. This may be, for example, the most recently released version, or the latest for a particular beta release that the user has opted in to. The client then connects to a content server (such as content server 110 shown in FIG. 1) and downloads the manifest for that version (if the client already has the latest version, there may be nothing to do).

The client then scans the manifest and identifies all of the chunks that are not currently present on the machine associated with the client. The client can normally determine this quickly because the manifest for the currently installed game may be kept cached on disk. If this cache is deleted or corrupted, the client can scan the game files and analyze their data to determine which chunks are present.

As chunks are downloaded from content servers, they are written to a temporary file on the machine associated with the client. Once all chunks are downloaded, the client begins patching the local game files. Any files that need updating may be constructed in a temporary staging folder, using data from the previous version's files and the downloaded chunks. Once all necessary files have been successfully constructed, the previous version's files may be replaced with the updated files and any orphaned files (no longer in the new version) may be deleted. Status flags in the file used to cache the manifest may be used to track this process, so if it were to be interrupted for some reason, the client could determine what state the files were in upon the next launch of the program. Once the game files have been fully updated, any temporary files (including the chunk data file) may be removed from disk.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein.

The invention claimed is:

1. A method comprising:
   receiving, by a client with access to a first version of a digital file, from a content server, a first chunk of a second version of the digital file without the client receiving a second chunk of the second version of the digital file from the content server, wherein the first chunk is not included within the first version of the digital file, and wherein the second chunk is included in both the first version of the digital file and the second version of the digital file;
   receiving, by the client, from the content server, recompilation information that includes:
      a first byte offset indicating a first location of a first instantiation of the first chunk within the second version of the digital file;
      a second byte offset indicating a second location of a second instantiation of the first chunk within the second version of the digital file; and
      a third byte offset indicating a third location of the second chunk within the second version of the digital file; and
   recompiling, by the client, the second version of the digital file using the first chunk that the client received from the content server, the second chunk retrieved from the first version of the digital file accessible to the client, and the recompilation information.

2. The method of claim 1, wherein the client recompiles the second version of the digital file without using the entirety of the first version of the digital file accessible to the client.

3. The method of claim 1, further comprising, prior to the receiving of the first chunk, sending, by the client, to the content server, a request for the second version of the digital file.

4. The method of claim 1, further comprising, prior to the receiving of the first chunk, sending, by the client, to the content server, an indication that the client has access to the first version of the digital file.

5. The method of claim 1, wherein:
   the receiving of the recompilation information comprises downloading a manifest that includes the recompilation information prior to the receiving of the first chunk;
   the method further comprises determining, based at least in part on the manifest, that the first chunk is not included within the first version of the digital file; and the receiving of the first chunk comprises downloading the first chunk based at least in part on the determining that the first chunk is not included within the first version of the digital file.

6. The method of claim 1, wherein the client recompiles the second version of the digital file in a temporary staging folder as a recompiled second version of the digital file, the method further comprising replacing the first version of the digital file accessible to the client with the recompiled second version of the digital file.

7. The method of claim 1, wherein the second version of the digital file represents a latest version of a game file that is usable to play a video game on the client.

8. A client computer comprising:
a processor; and
memory storing a first version of a digital file and computer-executable instructions that, when executed by the processor, cause the client computer to:
receive, from a content server, a first portion of a second version of the digital file without the client computer receiving a second portion of the second version of the digital file from the content server, wherein the first portion is not included within the first version of the digital file, and wherein the second portion is included in both the first version of the digital file and the second version of the digital file;
receive, from the content server, a manifest that includes:
first offset information indicating a first location of a first instantiation of the first portion within the second version of the digital file;
second offset information indicating a second location of a second instantiation of the first portion within the second version of the digital file; and
third offset information indicating a third location of the second portion within the second version of the digital file; and
generate the second version of the digital file using the first portion that the client computer received from the content server, the second portion retrieved from the first version of the digital file accessible to the client computer, and the manifest.

9. The client computer of claim 8, wherein the client computer generates the second version of the digital file without using the entirety of the first version of the digital file accessible to the client computer.

10. The client computer of claim 8, wherein the computer-executable instructions, when executed by the processor, further cause the client computer to, prior to receiving the first portion, send, to the content server, a request for the second version of the digital file.

11. The client computer of claim 8, wherein the computer-executable instructions, when executed by the processor, further cause the client computer to, prior to receiving the first portion, send, to the content server, an indication that the client computer has access to the first version of the digital file.

12. The client computer of claim 8, wherein:
the manifest is received prior to receiving the first portion;
the computer-executable instructions, when executed by the processor, further cause the client computer to determine, based at least in part on the manifest, that the first portion is not included within the first version of the digital file; and receiving the first portion comprises downloading the first portion based at least in part on the determining that the first portion is not included within the first version of the digital file.

13. The client computer of claim 8, wherein the client computer generates the second version of the digital file in a temporary staging folder as a generated second version of the digital file, and the computer-executable instructions, when executed by the processor, further cause the client computer to replace the first version of the digital file accessible to the client computer with the generated second version of the digital file.

14. The client computer of claim 8, wherein the second version of the digital file represents a latest version of a game file that is usable to play a video game on the client computer.

15. A non-transitory computer-readable medium storing computer-executable instructions that, when executed by a processor of a client, cause performance of operations comprising:
receiving, from a content server, a first chunk of a second version of a digital file without the client receiving a second chunk of the second version of the digital file from the content server, wherein the first chunk is not included within a first version of the digital file accessible to the client, and wherein the second chunk is included in both the first version of the digital file and the second version of the digital file;
receiving, from the content server, recompilation information that includes:
a first byte offset indicating a first location of a first instantiation of the first chunk within the second version of the digital file;
a second byte offset indicating a second location of a second instantiation of the first chunk within the second version of the digital file; and
a third byte offset indicating a third location of the second chunk within the second version of the digital file; and
recompiling, the second version of the digital file using the first chunk that the client received from the content server, the second chunk retrieved from the first version of the digital file accessible to the client, and the recompilation information.

16. The non-transitory computer-readable medium of claim 15, the operations further comprising, prior to the receiving of the first chunk, sending, to the content server, a request for the second version of the digital file.

17. The non-transitory computer-readable medium of claim 15, wherein:
the receiving of the recompilation information comprises downloading a manifest that includes the recompilation information prior to the receiving of the first chunk;
the operations further comprise determining, based at least in part on the manifest, that the first chunk is not included within the first version of the digital file; and
the receiving of the first chunk comprises downloading the first chunk based at least in part on the determining that the first chunk is not included within the first version of the digital file.

18. The non-transitory computer-readable medium of claim 15, wherein the client recompiles the second version of the digital file without using the entirety of the first version of the digital file accessible to the client.

19. The non-transitory computer-readable medium of claim 15, wherein the second version of the digital file represents a latest version of a game file that is usable to play a video game on the client.

20. The non-transitory computer-readable medium of claim 15, the operations further comprising, prior to the receiving of the first chunk, sending, to the content server, an indication that the client has access to the first version of the digital file.

* * * * *